US011221271B2

(12) United States Patent
Stothard (10) Patent No.: US 11,221,271 B2
(45) Date of Patent: Jan. 11, 2022

(54) PHOTOACOUSTIC SENSOR FOR DETECTING TRACE AMOUNTS OF HYDROCARBONS IN GASES OR LIQUIDS

(71) Applicant: FRAUNHOFER UK RESEARCH LTD, Glasgow (GB)

(72) Inventor: David Stothard, Glasgow (GB)

(73) Assignee: FRAUNHOFER UK RESEARCH LTD, Glasgow (GB)

( * ) Notice: Subject to any disclaimer, the term of this patent is extended or adjusted under 35 U.S.C. 154(b) by 384 days.

(21) Appl. No.: 15/760,963

(22) PCT Filed: Sep. 16, 2016

(86) PCT No.: PCT/GB2016/052902
§ 371 (c)(1),
(2) Date: Mar. 16, 2018

(87) PCT Pub. No.: WO2017/046608
PCT Pub. Date: Mar. 23, 2017

(65) Prior Publication Data
US 2018/0266914 A1    Sep. 20, 2018

(30) Foreign Application Priority Data
Sep. 17, 2015   (GB) ..................... 1516524

(51) Int. Cl.
*G01M 3/38*    (2006.01)
*G01N 29/24*    (2006.01)
(Continued)

(52) U.S. Cl.
CPC .......... *G01M 3/38* (2013.01); *G01N 21/1702* (2013.01); *G01N 29/2425* (2013.01);
(Continued)

(58) Field of Classification Search
CPC . G01M 3/38; G01N 21/1702; G01N 29/2425; G01N 29/4436;
(Continued)

(56) References Cited

U.S. PATENT DOCUMENTS 5,945,592 A    8/1999  Chou
9,810,786 B1*  11/2017 Welford ................ G01S 7/4814
(Continued)

FOREIGN PATENT DOCUMENTS

JP    2009036578 A    2/2009

OTHER PUBLICATIONS

Adam Polak, David J. M. Stothard, "Enhanced photoacoustic spectroscopy sensitivity through intra-cavity OPO excitation," Proc. SPIE 10629, Chemical, Biological, Radiological, Nuclear, and Explosives (CBRNE) Sensing XIX, 106291D (May 16, 2018); https://doi.org/10.1117/12.2305737 (Year: 2018).*
(Continued)

*Primary Examiner* — Alexander A Mercado
*Assistant Examiner* — Monica S Young
(74) *Attorney, Agent, or Firm* — Moore & Van Allen PLLC; W. Kevin Ransom (57) ABSTRACT

A detector comprises an optical parametric oscillator having a non-linear material adapted to convert via a parametric process pump light into down converted light of two different wavelengths, the first wavelength being longer than the second wavelength. The non-linear material is provided in a down converted wave cavity arranged to resonate only one of the first or second wavelengths. The detector comprises means for modulating light in the down converted wave cavity to induce an acoustic or pressure wave caused by absorption of the resonant one of the first and second wavelengths. The detector further comprises means located in the down-converted wave cavity for detecting the acoustic
(Continued)

or pressure wave. The detector may be used for detecting or sensing very low levels of a fluid, for example a gas such as ethane.

33 Claims, 10 Drawing Sheets

(51) Int. Cl.
    *G01N 29/44*     (2006.01)
    *G01N 21/17*     (2006.01)
    *G02F 1/39*     (2006.01)

(52) U.S. Cl.
    CPC ........... *G01N 29/4436* (2013.01); *G02F 1/39* (2013.01); *G01N 2021/1704* (2013.01); *G01N 2291/02433* (2013.01); *G01N 2291/0427* (2013.01)

(58) Field of Classification Search
    CPC ... G01N 2291/0427; G01N 2021/1704; G01N 2291/02433; G02F 1/39
    USPC .............................................................. 73/4
    See application file for complete search history.

(56) References Cited

U.S. PATENT DOCUMENTS

| | | | | |
|---|---|---|---|---|
| 2003/0189711 | A1* | 10/2003 | Orr | G01N 21/39 356/484 |
| 2004/0095579 | A1* | 5/2004 | Bisson | G01N 21/1702 356/432 |
| 2005/0117155 | A1* | 6/2005 | Kosterev | G01N 29/2425 356/432 |
| 2005/0243876 | A1* | 11/2005 | Kung | G02F 1/39 372/21 |
| 2006/0123884 | A1* | 6/2006 | Selker | G01N 21/1702 73/24.02 |
| 2007/0064748 | A1* | 3/2007 | Mirov | C30B 31/00 372/20 |
| 2008/0127715 | A1* | 6/2008 | Kosterev | G01N 21/1702 73/24.02 |
| 2009/0141281 | A1* | 6/2009 | Stothard | H01S 3/1083 356/437 |
| 2009/0249521 | A1* | 10/2009 | Dazzi | G01Q 60/32 850/33 |
| 2011/0088453 | A1* | 4/2011 | Nicoletti | B82Y 15/00 73/24.02 |
| 2011/0214479 | A1* | 9/2011 | Kachanov | G01N 21/1702 73/24.02 |
| 2016/0111848 | A1* | 4/2016 | Hellstrom | H01S 3/1028 372/20 |
| 2016/0169740 | A1* | 6/2016 | Jiang | G01N 21/39 356/407 |
| 2017/0269389 | A1* | 9/2017 | Kieling | G02F 1/3501 |
| 2018/0266914 | A1* | 9/2018 | Stothard | G01N 29/2425 |

OTHER PUBLICATIONS

Applications of quartz tuning forks in spectroscopic gas sensing Anatoliy A. Kostereva! and Frank K. Tittel Rice Quantum Institute, Rice University, Houston, Texas 77251-1892 Dmitry V. Serebryakov, Alexander L. Malinovsky, and Igor V. Morozov published online Mar. 23, 2005 (Year: 2005).*
Jos Oomens, Scott E. Bisson, Matthew Harting, Thomas J. Kulp, Frans J. M. Harren, "New laser sources for photoacoustic trace gas detection with applications in biomedical science," Proc. SPIE 3916, Biomedical Optoacoustics, (May 19, 2000); https://doi.org/10.1117/12.386333 (Year: 2000).*
Photoacoustic Trace Detection of Methane Using Compact Solid-State Lasers† Geng-Chiau Liang, Hon-Huei Liu, and A. Kung Institute of Atomic and Molecular Sciences, A. Mohacsi,‡ A. Miklos, and P. Hess https://pubs.acs.org/doi/pdf/10.1021/jp001274b Jun. 1, 2000 (Year: 2000).*
Cavity-enhanced optical feedback-assisted photo-acoustic spectroscopy with a 10.4 Im external cavity quantum cascade laser A. Kachanov • S. Koulikov • F. K. Tittel Published online: Nov. 23, 2012 https://link.springer.com/content/pdf/10.1007/s00340-012-5250-z.pdf (Year: 2012).*
International Search Report for PCT/GB2016/052902 dated Sep. 16, 2016.
Search Report of Intellectual Property Office of UK for GB1516524.4 dated Jan. 26, 2016.
Written Opinion of the International Searching Authority for PCT/GB2016/052902 dated Sep. 16, 2016.
Borri S et al.; Intracavity quartz-enhanced photoacoustic sensor:; Applied Physics Letters, AIP Publishing LLC, US; vol. 104, No. 9, Mar. 3, 2014 (Mar. 3, 2014) Nov. 5, 2016 (Nov. 5, 2016) p. 091114-1-091114-3.
Magnus W. Haakestad et al.; "Intracavity trace molecular detection with a broadband mid-IR frequency comb source"; Journal of the Optical Society of America; vol. 3, No. 3, Jan. 22, 2013, p. 631, Figure 5.
Van Herpen M M J W et al.; "Optical parametric oscillator-based photoacoustic detection of C02 at 4.23 allows real-time monitoring of the respiration of small insects", Applied Physics B; Lasters and Optics, Springer, Berlin, DE, vol. 82, No. 4, Jan. 13, 2006, pp. 666-667, Figure 1.
PCT, International Preliminary Report on Patentability (IPRP) and Written Opinion of the International Searching Authority of PCT/GB2016/052902 dated Mar. 20, 2018, 11 pages.

* cited by examiner

PHOTOACOUSTIC SENSOR FOR DETECTING TRACE AMOUNTS OF HYDROCARBONS IN GASES OR LIQUIDS

CROSS-REFERENCE TO RELATED APPLICATION(S)

This application is a national stage application (filed under 35 § U.S.C. 371) of PCT/GB2016/052902, filed Sep. 16, 2016 of the same title, which, in turn claims priority to United Kingdom Application No. 1516524.4, filed Sep. 17, 2015 of the same title; the contents of each of which are hereby incorporated by reference.

FIELD OF THE INVENTION

The present invention relates to a detector for detecting fluid (e.g. gas or liquid). In particular, the present invention relates to a gas detector for detecting very low levels of ethane gas leaking from the surface of the earth or fugitive from a man-made object such as a processing plant.

BACKGROUND OF THE INVENTION

The detection of elevated trace levels of leaking hydrocarbons is a valuable tool in the prospecting and development of new hydrocarbon reserves. Over time, a small proportion of gas from underground reservoirs leaks up to the surface where it can be subsequently detected. This may happen some distance from the actual point at which the gas emerges from the ground and so the significant dilution with the atmosphere results in very low concentrations of the hydrocarbon species of interest. This requires the use of very sensitive instruments.

Although methane is the energy source sought through this process, methane cannot be used as a marker as it is present in the background atmosphere to the extent that elevated levels caused by the proximity of an underground deposit would be obscured. Atmospheric concentrations rise due surface leakage by one or two parts-per-billion (ppb) depending on distance and weather conditions and so it is easy to see how differentiating this signal from a fluctuation in the background level of ~1 part-per-million (ppm) (i.e. only 1 part in 1000) is highly problematic. Ethane is also abundant in hydrocarbon reservoirs, but is much less prevalent in the atmosphere at ~1 ppb. Therefore, it is an ideal indicator of hydrocarbon reservoirs as seepage leads to substantial modulation of this background level. The very low concentrations, as already stated, require very sensitive instruments—and the requirement to differentiate between methane and ethane places an additional requirement on the system of selectivity.

Many ultra-high sensitivity detection technologies have been developed. These can be categorized as falling into three general technologies: analytical (gas chromatography, spectrometry, etc.); electro- and bio-chemical; and laser optical absorption. Whilst delivering the most sensitive and robust measurements, analytical devices do not offer real-time measurements and are large, laboratory-based instruments that cannot be readily deployed in the field. Electro- and bio-chemical sensors offer reasonable sensitivity (ppm), are compact and consume very little energy making them very well suited to small, remotely-operated instruments. However, they do not exhibit the required sensitivity for the current application and their very slow response time (many minutes), hysteresis and sensitivity to humidity also render them unsuitable in many scenarios. In contrast, optical absorption sensors offer significantly faster detection times (~1 sec), are highly target-molecule specific, can be compact, and can potentially offer sensitivities down to sub-ppt concentration levels.

All forms of laser absorption sensor are dependent upon the principle that incident electromagnetic radiation of the correct frequency resonates with a particular electronic (in the case of visible and near-IR) or rotational/vibrational (for infrared) transition or mode of the molecule of interest, and in so doing is absorbed. The resonant nature of this interaction means that only light in a narrow bandwidth around the correct frequency contributes to this process, requiring spectrally pure radiation to be used. In the case of the simple hydrocarbons of interest in the current application, the peak absorption wavelength lies in the region of 3.3 µm. For maximum optical absorption this requires the use of a laser which operates at this wavelength.

Photo-acoustic spectroscopy is a form of laser absorption spectroscopy. It works on the principle that absorption of laser light causes localized heating. If the incident light is modulated (in amplitude or frequency), the absorption is modulated and a periodic pressure wave (i.e. a sound wave) is produced at the modulation frequency which can then be detected with a microphone. The sound wave can be substantially enhanced by conducting this process within an absorption cell which is acoustically resonant at the modulation frequency, so the sound wave bounces back and forth within the cell acquiring more intensity on each pass. By careful design of the cell, the microphone can be placed at an anti-nodal point in the acoustic wave so as to maximize the detection of this enhanced signal. Quartz-enhanced photo-acoustic spectroscopy is a refinement of classical photo-acoustic spectroscopy. Quartz-enhanced photo-acoustic spectroscopy uses a quartz tuning fork, which is a sharply resonant detection element, to detect the pressure or sound wave.

Figure 1:
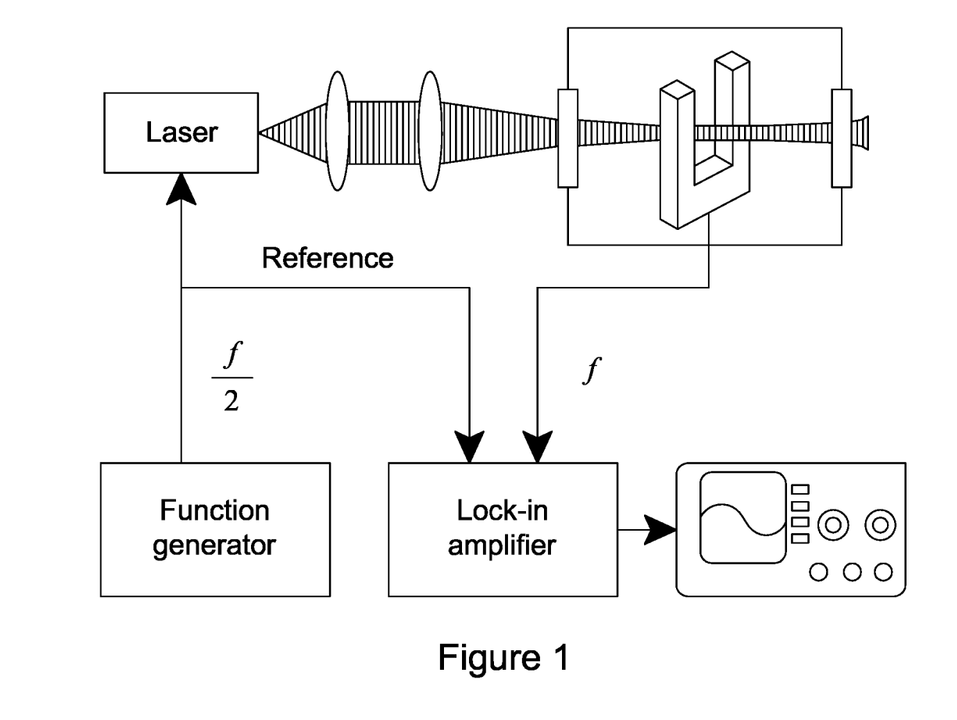
FIG. 1 is a schematic diagram of a quartz-enhanced photo-acoustic system.
Figure 2:
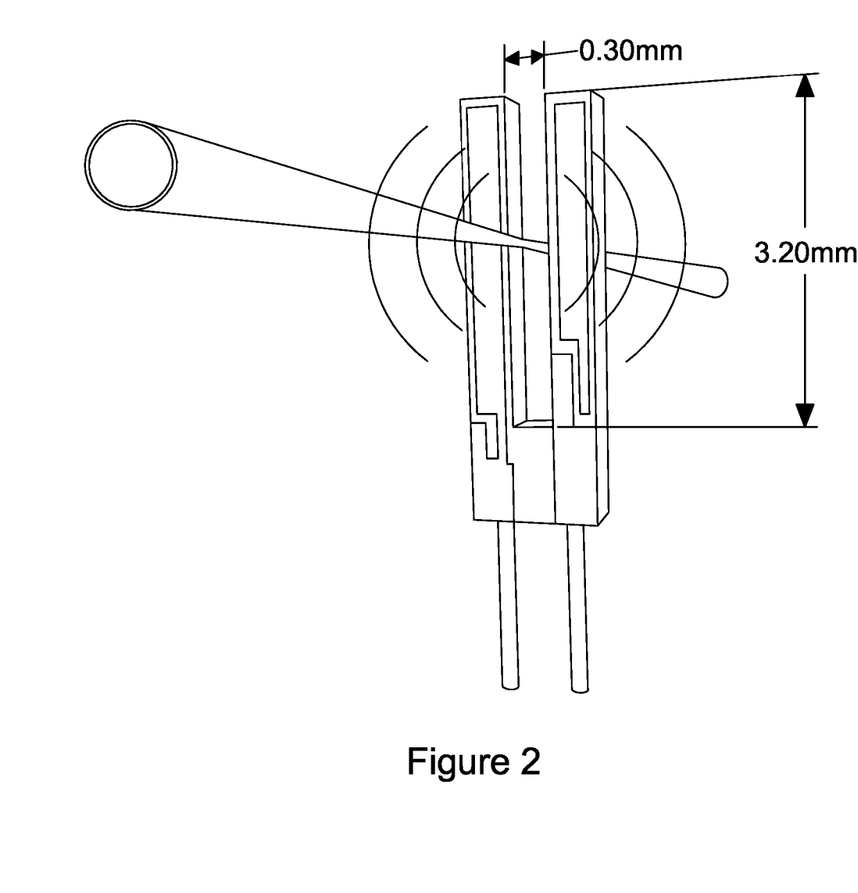
FIG. 2 is an expanded schematic view of a quartz tuning fork for use in the system of FIG. 1.
Figure 3:
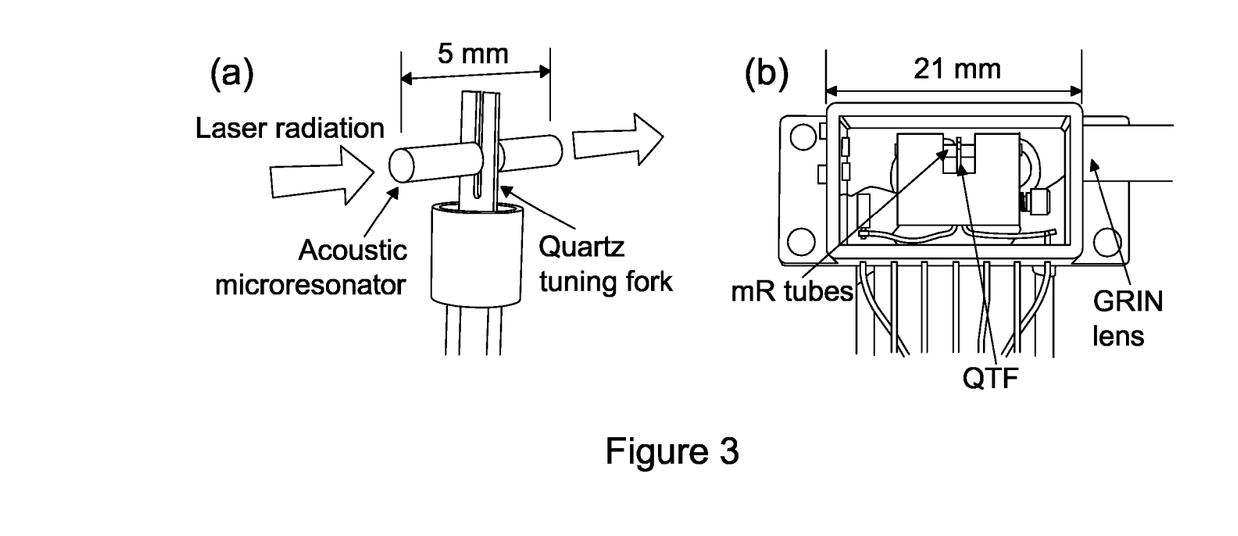
FIG. 3(a) is an expanded schematic view of a quartz tuning fork in which an acoustic micro-resonator is included to enhance the acoustic signal.
FIG. 3(b) is a photograph of an actual system showing its highly compact form.

FIG. 1 shows a schematic diagram of a standard quartz-enhanced photo-acoustic system. An excitation beam from a laser source is focused down in between two vertical prongs of a quartz tuning fork. The incident radiation is frequency or amplitude modulated at the resonant frequency of the quartz tuning fork. On each cycle, a very small thermally induced expansion caused by optical absorption within the gas causes a local pressure wave, as shown in FIG. 2. This induces a symmetric bending mode of the quartz tuning fork. The amplitude of this mode is increased over time by the very high Q of the quartz tuning fork. In practice, the signal obtained from the quartz tuning fork can be enhanced further by placing it within a micro-resonator tube of organ-pipe (i.e. windowless) design, as shown in FIG. 3. Such an improvement confers well in excess of an additional order of magnitude improvement in the signal obtained from the quartz tuning fork. An advantage of quartz-enhanced photo-acoustic spectroscopy is that it is immune from background acoustic noise. Also, quartz-enhanced photo-acoustic spectroscopy lends itself to compact detection topologies.

Aside from factors arising from the particular "classic" or quartz-enhanced photo-acoustic spectroscopy cell used, absolute sensitivity is related to the strength of the optical absorption feature exhibited by the molecule of interest, its concentration and, critically, the power of the excitation laser used. To date, the highest sensitivity quartz-enhanced photo-acoustic spectroscopy devices have been demonstrated on complex molecules whose peak absorption wavelength occurs in the deeper-infrared.

A disadvantage of photo-acoustic spectroscopy in general, and quartz-enhanced photo-acoustic spectroscopy in particular, is that high power lasers are needed to detect gases with sub-parts per billion resolution in the mid-infrared (3-4 μm) range. Lasers operating at these wavelengths are typically large and require substantial electrical power.

SUMMARY OF THE INVENTION

According to the present invention, there is provided a sensor, for example a gas sensor, comprising: an optical parametric oscillator having a non-linear material adapted to convert via a parametric process pump light into down converted light of two different wavelengths, the first wavelength being longer than the second wavelength, wherein the non-linear material is provided in a down converted wave cavity arranged to resonate only one of the first or second wavelengths, means for modulating light in the down converted wave cavity to induce an acoustic or pressure wave caused by absorption of the resonant wave, and means, for example a microphone, located in the beam path of the down converted resonant light for detecting the acoustic or pressure wave.

The optical parametric oscillator may have a pump cavity arranged to resonate the pump light, wherein the pump cavity and the down converted wave cavity partially overlap. The non-linear material may be in both the pump wave cavity and the down converted wave cavity.

By placing the optical parametric oscillator within the cavity of a high finesse pump laser, it accesses the very high circulating pump fields found there. It will therefore be brought to threshold for very low primary (i.e. diode) pump powers. By using the down converted wave resonating within the down converted wave cavity of an intra-cavity optical parametric oscillator as the excitation source for a photoacoustic sensor, there is provided a very simple and compact gas sensor solution that can provide high levels of sensitivity. This is because the down converted wave is resonant and can therefore build up to a high intensity, and intra-cavity optical parametric oscillators can be made small and relatively lightweight compared to other high power laser sources. Advantageously, this means the gas sensor of the invention can be made portable.

Another advantage conferred by the optical parametric oscillator is that the down converted wave lengths are tunable, even if the parent pump laser in which it resides is not. This allows many different molecules, exhibiting absorption at different wavelengths to be detected with a single device. The device can operate with a very narrow optical line width, and this, along with its very broad tunability and high power circulating field, confers very high sensitivity (due to high circulating power), flexibility in choice of target molecular species (because of the broad tunability) and target specificity (because of the narrow optical line width of the resonating field).

The gas sensor may include a photo-acoustic cell, the microphone being located in the photo-acoustic cell. The microphone may comprise a tuning fork, for example a quartz tuning fork.

The means for modulating may comprise a modulator, for example an optical element such as an etalon for modulating the light. The means for modulating may be operable to vary a characteristic of the primary pump power source or one or more of the optical cavities thereby to cause modulation. For example, the means for modulating may be operable to vary the current used to drive the pump source. Alternatively or additionally, the means for modulating may be operable to vary the length of one or more of the optical cavities.

The means for modulating light may be operable to modulate the resonant light in the down converted wave cavity at a frequency tuned to the resonant frequency of the tuning fork or the acoustic cell. The means for modulating light may modulate the frequency or intensity of the light.

The means for modulating light may be provided in the pump cavity or the down converted wave cavity.

The means for modulating light may be operable to modulate the primary pump power, thereby to cause modulation of light in the down converted wave cavity.

The gas sensor may be arranged so that the first, longer wavelength is resonant in the down converted wave cavity.

The wavelength of the resonant light is selected to match an absorption characteristic of a gas of interest. For example, for ethane detection applications, the resonant wavelength may be in the region of 3.35 μm.

The gas sensor may comprise an acoustic amplifier, for example a microresonator tube, for enhancing the acoustic or pressure wave. Where a tuning fork is used the amplifier may be located either side of the two forks of the tuning fork. Alternatively, the tuning fork may be located immediately adjacent to a small opening in the side of the resonator tube.

The sensor may include a reference cell containing reference fluid. The sensor may be adapted to use the reference cell ensure the OPO is tuned to a predetermined wavelength.

The optical parametric oscillator may be operated in a continuous wave (CW) mode.

The optical parametric oscillator may be operated in a pulsed mode.

The optical parametric oscillator may be doubly or multiply resonant.

The down converted wave cavity may have a standing-wave cavity configuration or a linear cavity configuration. The down converted wave cavity may have a travelling-wave cavity configuration or a ring cavity configuration.

The pump cavity may have a standing-wave cavity configuration or a linear cavity configuration. The pump cavity may have a travelling-wave cavity configuration or a ring cavity configuration.

BRIEF DESCRIPTION OF THE DRAWINGS

Various aspects of the invention will now be described by way of example only with reference to the accompanying drawings, of which.

DETAILED DESCRIPTION OF THE DRAWINGS

Figure 4:
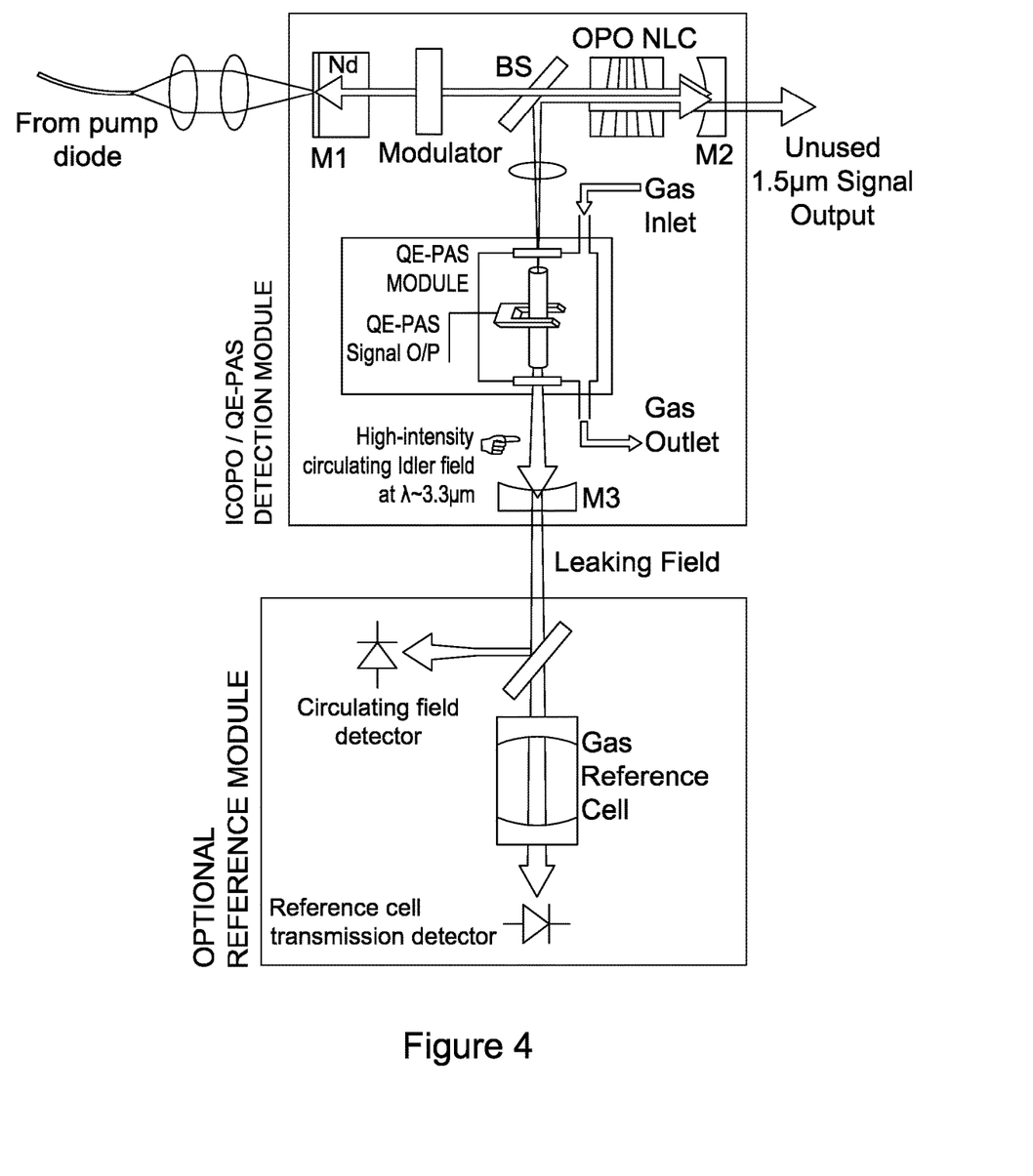
FIG. 4 is a schematic representation of an intracavity optical parametric oscillator quartz enhanced photo-acoustic gas sensor.

FIG. 4 shows an intra-cavity optical parametric oscillator in which a quartz-enhanced photo-acoustic spectroscopy cell is located in one of the optical cavities. This optical parametric oscillator can be operated in a continuous wave (CW) mode or a pulsed mode.

Figure 5:
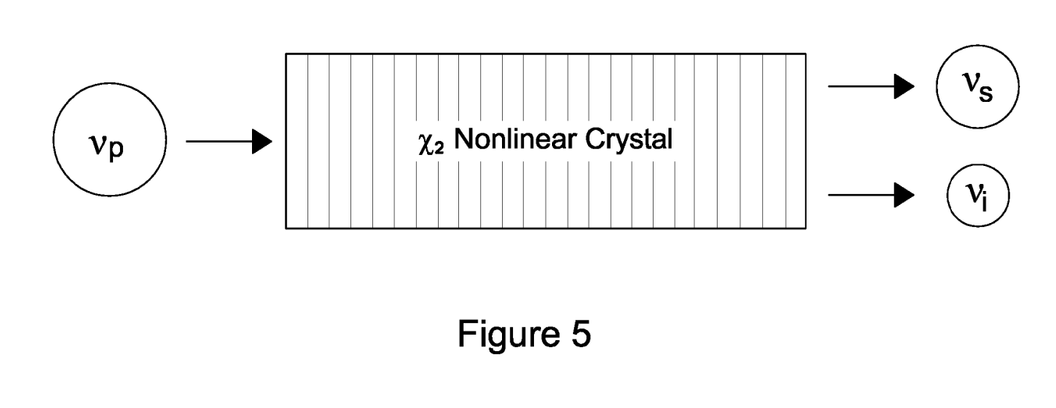
FIG. 5 is a schematic representation of the parametric process in a non-linear crystal, such as a periodically poled crystal.

The intra-cavity optical parametric oscillator of FIG. 4 has two optical cavities coupled by a non-linear crystal, for example a birefringent or periodically-poled crystal (such as periodically poled lithium niobate). Parametric frequency conversion in the non-linear crystal divides the energy of a high-frequency photon into two lower energy photons, as shown in FIG. 5. As the energy of each of the two generated photons is lower, their wavelength is longer. The input light is usually called the pump light, and the two down converted waves are called the signal and idler waves. By convention the longer wavelength of the two is denoted the idler. The ratio of the split from the high energy pump photon to the signal and idler can be varied and so the output wavelengths are tunable, even if the pump laser is not. For a typical periodically-poled non-linear crystal, pumped at $\lambda \approx 1.06$ μm, the signal wavelength is $\lambda \approx 1.6$ μm and the idler wavelength is $\lambda \approx 3.3$ μm. An idler wavelength around 3.35 μm is ideally matched to the absorption wavelength of ethane.

The first cavity of the intracavity optical parametric oscillator of FIG. 4 is defined by two reflectors, in this case two mirrors M1 and M2. This cavity contains both the laser gain medium (in the case of FIG. 4; a neodymium crystal Nd) and the nonlinear crystal. The cavity is pumped by the primary pump source, in this case a fibre-coupled laser diode. Mirrors M1 and M2 are highly reflective at the pump wavelength. This cavity is generally referred to as the pump cavity. The second cavity is also defined by two reflectors, in this case two mirrors M2 and M3. A dichroic beamsplitter BS is provided on the optical path between the two mirrors M2 and M3 for directing the resonated down-converted wave (for example, the idler) between these two mirrors. It is anti-reflecting for the pump wave, and highly reflecting for the resonant down converted wave. This cavity is generally referred to as the down converted wave cavity. The reflectors M2 and M3 are highly reflective at the down-converted wave (in this case, the idler) wavelength, so that the idler is resonant within the down converted wave cavity (it should be noted that this is contrary to standard practice in which the signal wave is resonant within the down converted wave cavity). Mirror M2 is transmissive at the signal wavelength, and so at least some of the signal wave exits the down converted wave cavity.

In the part of the down converted wave cavity, between the beam splitter and mirror M3, a photo-acoustic spectroscopy cell is provided. In the case shown in FIG. 4, this is a quartz-enhanced photoacoustic spectroscopy cell. This has a gas chamber for sampling gas, and a quartz tuning fork with a micro-resonator tube located inside the chamber. The chamber has a gas inlet and a gas outlet to allow gas samples to be circulated through the chamber actively or passively for example via a micro pump (not shown). Windows are provided on opposing sides of the chamber to allow the resonant idler wave that is circulating in the down converted wave cavity to pass through the chamber. Externally of the chamber a lens, or other device such as a curved mirror or grating is provided to focus the idler wave so that it passes through the micro-resonator tube of the quartz tuning fork. Use of a lens here is optional.

The optical field is modulated (either in wavelength or amplitude) by a modulator placed within the pump section of the cavity in order to match the sharp resonance peak of the quartz tuning fork within the quartz-enhanced photo-acoustic spectroscopy cell. Normally, the quartz tuning fork has a ~32 kHz resonance and coupled with its very high Q, has a build-up time constant of ~300 ms and so measurements can be made on the one second timescale. At a diode pump power of 3 W, more than 5 W of circulating idler field will be resonant within the down converted wave cavity. Because this field oscillates in both directions, it is absorbed by the gas twice on each round trip, giving an effective excitation power of >10 W. Absorption of the resonant idler wave causes localized heating, which in turn causes a pressure or sound wave, which is amplified and can be detected by the quartz tuning fork. This allows very sensitive quartz-enhanced photo-acoustic spectroscopy.

Whilst in the example described above a wavelength of 3.3 μm is described as resonating in the down converted wave cavity, optical parametric oscillators are tunable, flexible sources of radiation. Hence, the optical parametric oscillator could be tuned anywhere in the phase-matching/coating range (typically, 3-4 μm). This means that any gas with an absorption line in the tuning range could be detected. This might be useful for applications where many different compounds are present and so spectra need to be acquired at a high resolution and over a wide range. An example of this might be disease diagnosis through examination of exhaled breath. There are as many as 200 compounds and molecules in breath, most of them there in trace (~ppb) concentrations. Many early-stage diseases (cancer, certain mental conditions such as schizophrenia) result in enhanced levels of some of these compounds—but still only in trace levels, for example ~1 ppb background, with a change of a couple of ppb. Therefore, <<ppb resolution is required to make good measurements. High resolution and high sensitivity spectroscopy over very wide wavelength ranges are therefore required to differentiate between all these compounds. The sensor of the invention is able to deliver this level of sensitivity, whilst being compact and robust. The detection of molecules and compounds whose complexity places their absorption bands at very long wavelengths (for instance, in the 'spectral fingerprint' region of ~6-12 μm) is possible by simply by using the appropriate nonlinear crystal and gain medium.

A skilled person may appreciate that placing an absorbing medium (i.e. the gas to be detected) within a resonant cavity of an OPO will begin to impact upon the round-trip loss experienced by the resonating field, and hence OPO performance. At high gas concentrations, this will lead to a drop in the amount of circulating field produced, once the amount of absorption becomes significant. At very low concentrations (which are of primary interest in the current discussion), combined with the very short path lengths associated with the QE-PAS technique, the impact upon round-trip loss is negligible and can therefore be ignored. If maximum dynamic range were required, however, then at substantially higher concentrations (perhaps many parts per hundred) significant absorption will occur and may begin to significantly impact upon the circulating OPO field. Therefore, the same QE-PAS signal would be expected for two different target species concentrations—very low concentration (where there is a high optical field inducing an acoustic wave from very few molecules) and very high concentration (where not much field induces the same signal from a large number of molecules). Such an ambiguity could be eliminated through the use of a simple extra-cavity photodetector to monitor the circulating field as the measurement is obtained in order to discern under which one of these conditions the measurement is being performed. Such an enhancement would enable the device to yield maximum dynamic range, from very low (sub-parts per billion) to very high (parts per hundred) concentration; this upper limit being governed by the situation where the concentration (and hence absorption) is so high that it would terminate the operation of the OPO. This detector is denoted the circulating field detector in FIG. 4.

FIG. 4 shows an optional gas reference cell. This cell may have a sample of one or more target gaseous species contained within it. Accurate and automatic tuning of the OPO to the peak absorption wavelength can then be achieved by monitoring the absorption of the cell. This detection is achieved by dividing the signal from the reference cell transmission detector by the signal from the circulating field detector. The OPO can be coarsely tuned to the spectral region of interest, and then this reference cell absorption signal can be used to fine tune the OPO wavelength. It also serves as a safety mechanism to ensure that the wavelength has not drifted, which could lead to false negative detection (i.e. the instrument would not or under report the presence of the target gas).

Figure 6:
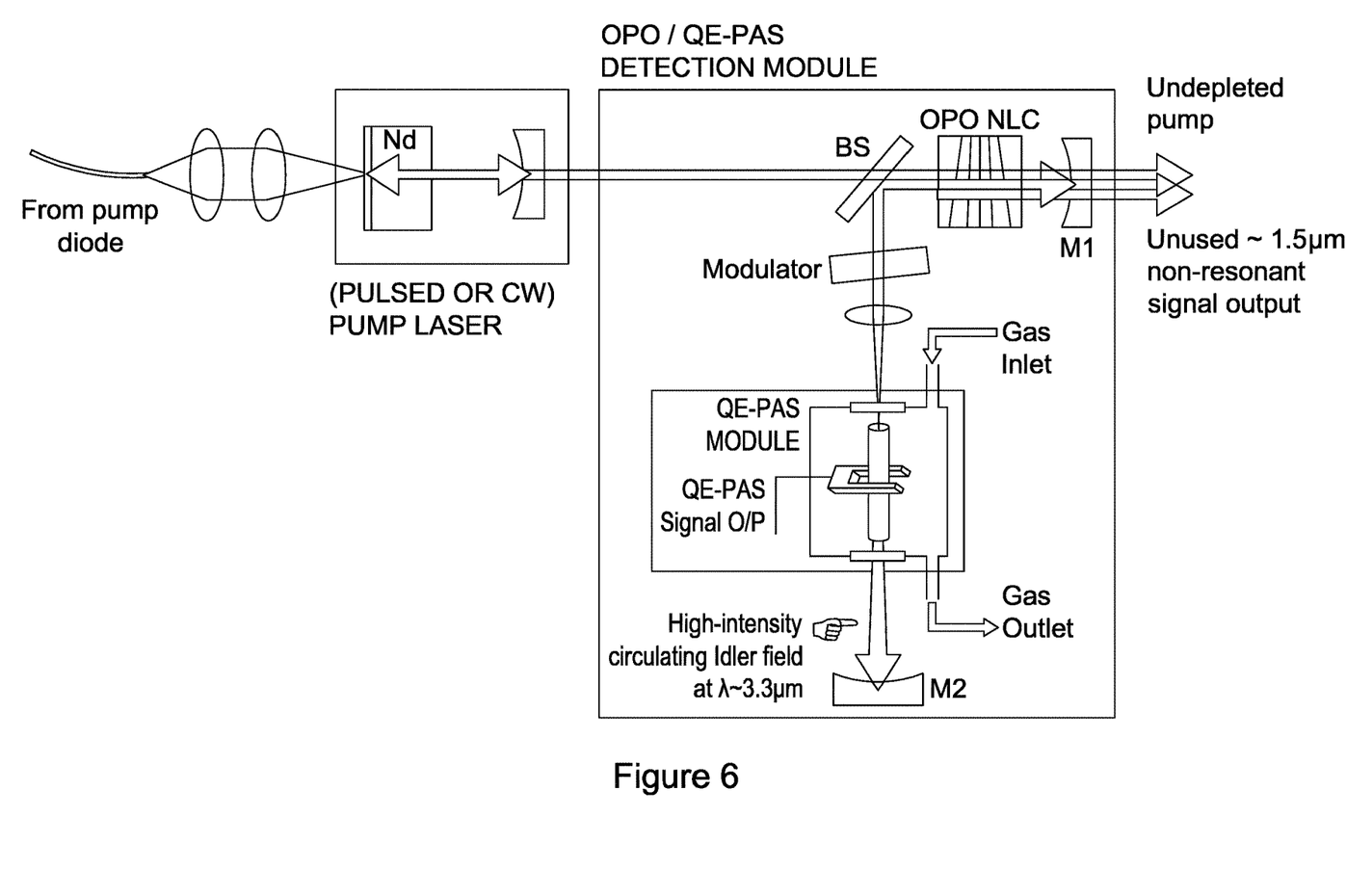
FIG. 6 is a schematic representation of an extra cavity, singly resonant optical parametric oscillator quartz enhanced photo-acoustic gas sensor.

The reader will appreciate that the enhancement brought about by placing the photo-acoustic detector within the cavity of the resonant down-converted wave is not limited to the intracavity OPO approach, but can be realized in different OPO geometries. FIG. 6 shows another OPO based gas sensor. This is an extra cavity, singly resonant optical parametric oscillator quartz enhanced photo-acoustic gas sensor. This OPO sensor can be operated in a continuous wave (CW) mode or a pulsed mode.

In FIG. 6, light from a diode laser is used to pump a laser gain medium located in the parent laser cavity, called the pump cavity. The pump cavity is defined by a flat reflector on a rear surface of the laser gain medium and a curved reflector. Pump laser light is resonated between the flat mirror and the curved mirror. This laser may either be operated in the continuous-wave or pulsed regime (for simplicity, the components required for any particular pulsed methodology are not shown). Some of the pump light is transmitted through the curved mirror and passed through a beamsplitter BS into an OPO cavity in which a non-linear crystal is positioned, thereby stimulating a parametric down-conversion process.

The OPO cavity is defined by a first curved mirror M1 and a second curved mirror M2. The beamsplitter BS directs light between the two mirrors M1 and M2; it is highly reflective at the wavelength of the resonant down-converted wave, but is anti-reflection coated for the pump wavelength. The non-linear crystal is positioned between the first curved mirror M1 and the beamsplitter BS. Between the beamsplitter BS and the second curved mirror M2 are positioned a modulator for modulating the light that is resonant in the OPO cavity, a quartz enhanced photo-acoustic cell and a lens or other device (such as a curved mirror or grating) is provided for focusing light into the quartz enhanced photo-acoustic cell.

The reflectivities of the mirrors M1 and M2 are selected to cause one of the down-converted waves to be resonant within the OPO cavity and allow the other one of the down-converted waves and the pump wave to exit the cavity. As an example, where the down-converted waves are a 1.5 µm signal wave and a 3.3 µm idler wave, the mirrors may be arranged to allow the 1.5 µm signal wave to leave the cavity and cause resonance of the 3.3 µm idler wave. The gas sensor is arranged so that only the resonant down converted wave passes through the photo-acoustic cell.

In use, the pump wave enters the OPO cavity, is pumped through the non-linear crystal thus stimulating the parametric down-conversion process. The selected one of the down converted waves (for example an idler wave of 3.3 µm) is resonated to create a very high intensity circulating field. The modulator is operated to modulate the resonant down converted wave in wavelength or amplitude. As with the sensor of FIG. 4, the modulation is selected to match the resonance peak of the quartz tuning fork. Absorption of the resonant down converted wave causes localized heating, which in turn causes a pressure or sound wave, which is amplified and can be detected by the quartz tuning fork. This allows very sensitive quartz-enhanced photo-acoustic spectroscopy. The modulator may be omitted from the cavity of the down converted wave and instead implemented in the pump laser to modulate its intensity or frequency.

Figure 7:
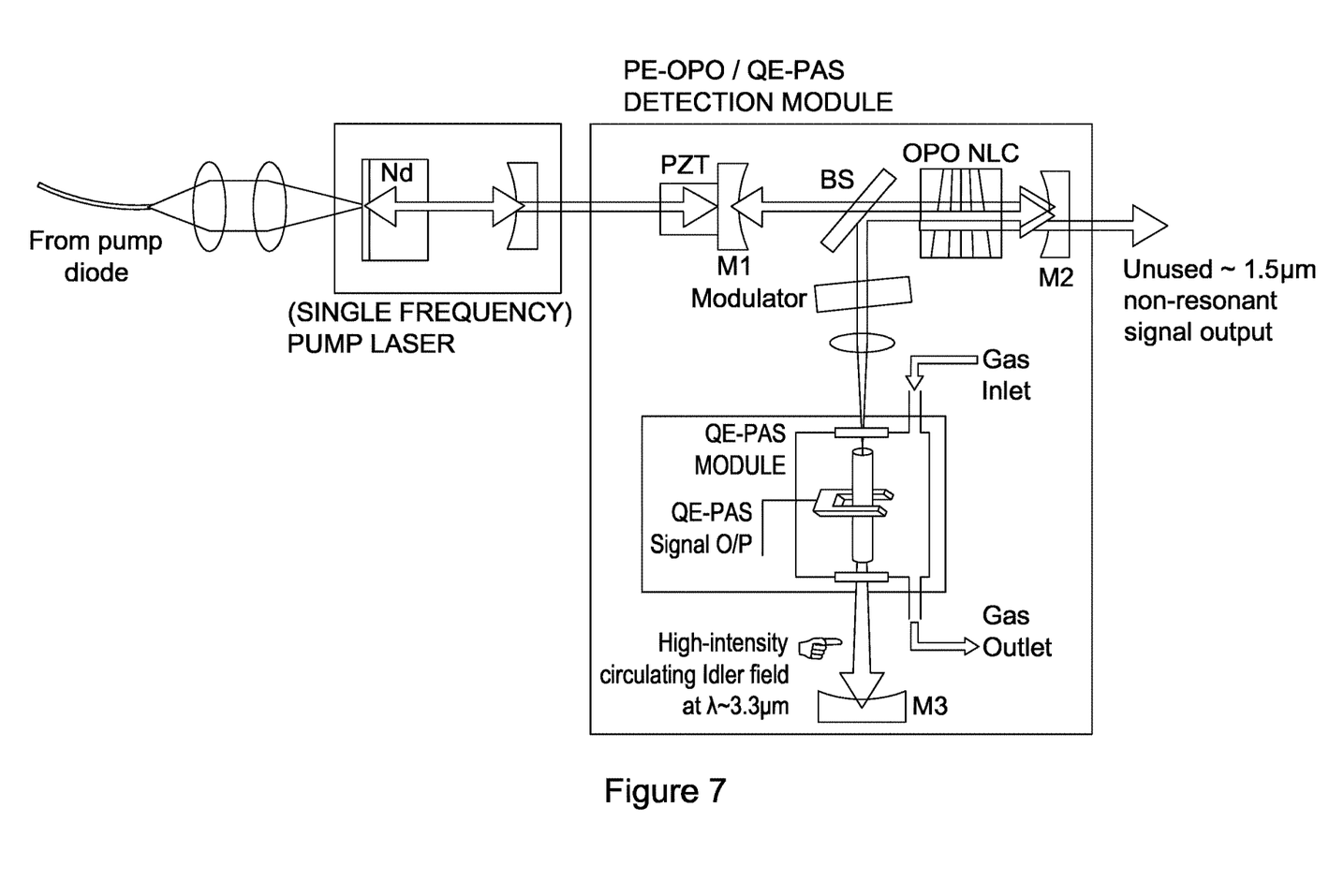
FIG. 7 is a schematic representation of an extra cavity, pump enhanced singly resonant optical parametric oscillator quartz enhanced photo-acoustic gas sensor.

FIG. 7 shows yet another OPO based gas sensor. This is an extra cavity, pump enhanced singly resonant optical parametric oscillator quartz enhanced photo-acoustic gas sensor. This OPO sensor can be operated in a continuous wave (CW) mode.

In this case, light from a diode is passed through a laser gain medium located in a laser pump cavity. The laser pump cavity is defined by a flat reflector on a rear surface of the laser gain medium and a curved reflector. Some of the single frequency pump light emitted from the laser pump cavity is transmitted through the curved partial mirror M1 and into a pump wave enhancement cavity that is defined by first and second curved mirrors M1 and M2. The first mirror M1 is a piezo mounted mirror that allows fine tuning of the M1-M2 cavity length to ensure that the pump cavity is held on resonance. This can be controlled using a feedback mechanism (not shown).

The pump wave cavity partially overlaps with an OPO cavity in which a non-linear crystal is positioned. The OPO cavity is defined by the second curved mirror M2 and a third curved mirror M3. A beamsplitter BS directs down-converted light between the two mirrors M2 and M3. The non-linear crystal is positioned between the second curved mirror M2 and the beamsplitter BS. This part of the OPO cavity overlaps with the pump wave cavity. Between the beamsplitter BS and the third curved mirror M3 are positioned a modulator for modulating the light that is resonant in the OPO cavity, a quartz enhanced photo-acoustic cell and a lens or other device (such as a curved mirror or grating) for focusing light into the quartz enhanced photo-acoustic cell.

The reflectivities of the mirrors M1, M2 and M3 are selected to cause the pump wave to be resonant within the pump cavity M1-M2 and one of the down-converted waves to be resonant within the OPO cavity M2-M3. The other one of the down-converted waves is allowed to exit the cavity. As an example, where the down-converted waves are a 1.5 µm signal wave and a 3.3 µm idler wave, the mirror M2 may be arranged to allow the 1.5 µm signal wave to leave the cavity and mirrors M2 and M3 may be arranged to cause resonance of the 3.3 µm idler wave. Only the resonant down converted wave passes through the photo-acoustic cell.

In use, the pump wave enters the pump wave cavity and circulates through the non-linear crystal. This stimulates the parametric down-conversion process. The selected one of the down converted waves is resonated to create a very high intensity circulating field (for example at 3.3 µm). The modulator is operated to modulate the resonant down converted wave in wavelength or amplitude. Absorption of the resonant down converted wave causes localized heating, which in turn causes a pressure or sound wave, which is amplified and can be detected by the quartz tuning fork.

Figure 8:
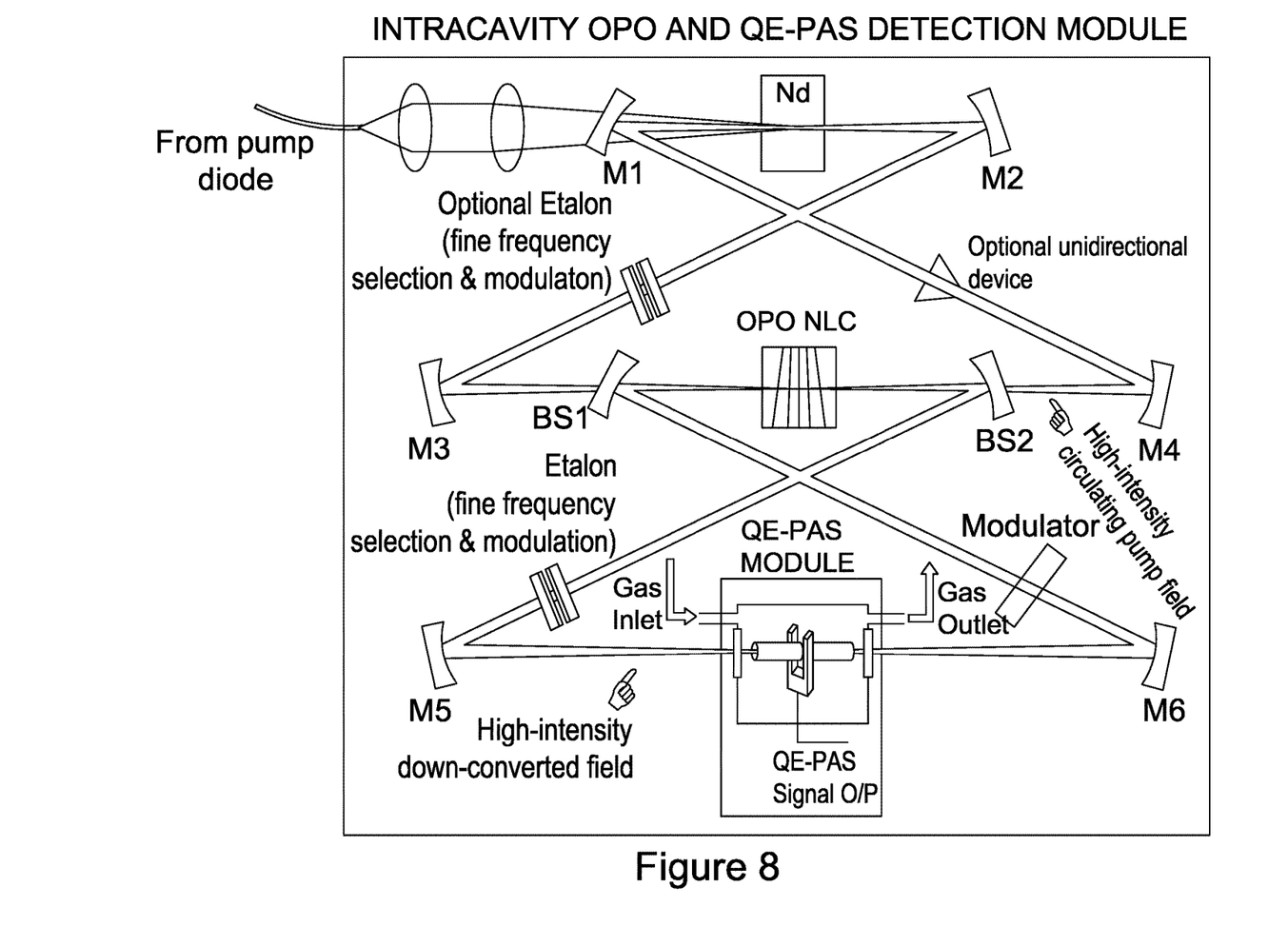
FIG. 8 is a schematic representation of an intracavity optical parametric oscillator quartz enhanced photo-acoustic gas sensor in which an optical cavity for a resonant pump wave and an optical cavity for a resonant down-converted wave both have a travelling-wave (ring) cavity configuration.
Figure 9:
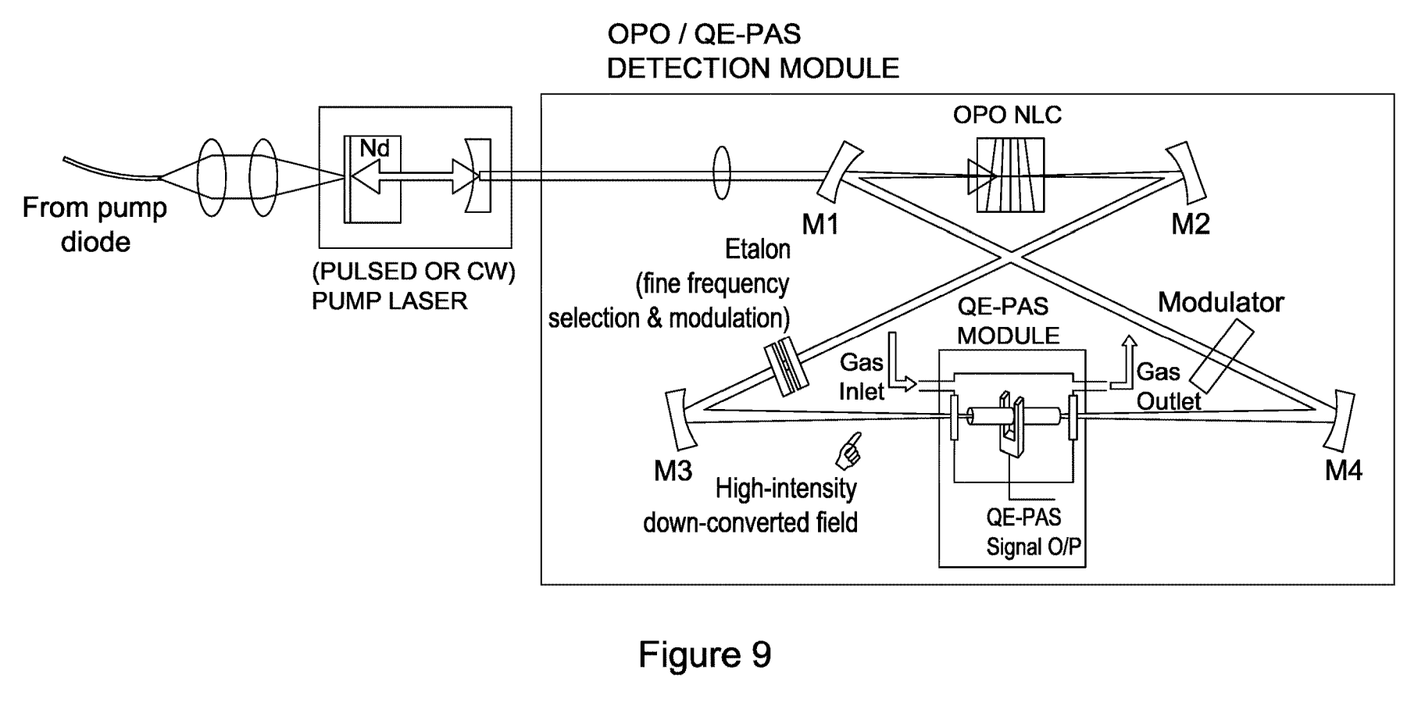
FIG. 9 is a schematic representation of an extra cavity, singly resonant optical parametric oscillator quartz enhanced photo-acoustic gas sensor in which an optical cavity for a resonant down-converted wave has a travelling-wave (ring) cavity configuration.
Figure 10:
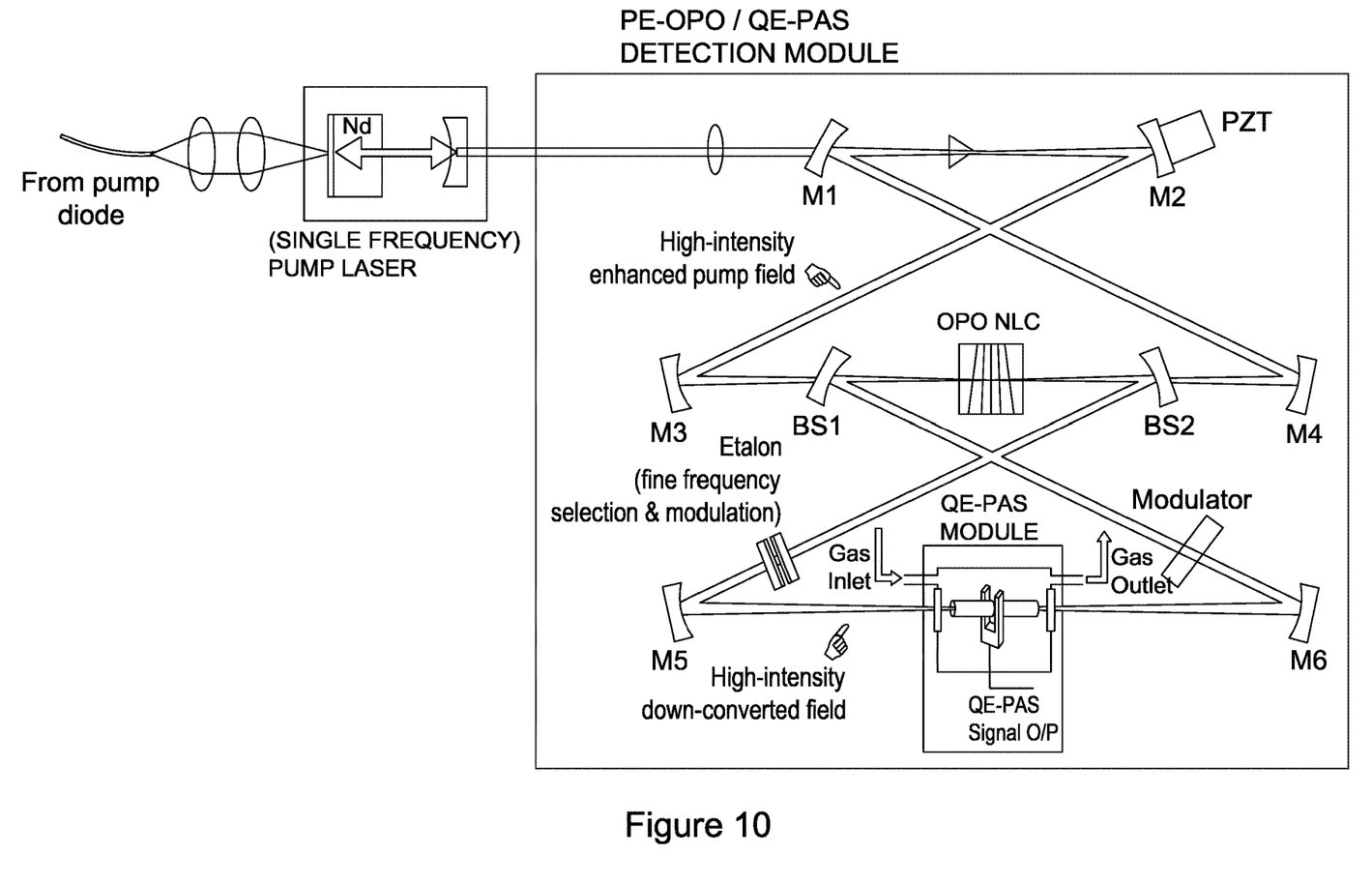
FIG. 10 is a schematic representation of an extra cavity, singly resonant optical parametric oscillator quartz enhanced photo-acoustic gas sensor in which an optical enhancement cavity for a pump wave and an optical cavity for a resonant down-converted wave both have a travelling-wave (ring) cavity configuration.

In both the examples shown in FIGS. 6 and 7, the optional optical reference cell of FIG. 4 could be used. Additionally or alternatively, in the systems depicted in FIGS. 4, 6 and 7, the standing-wave or linear optical cavity configuration of the resonant pump wave, the resonant down-converted wave, or both, could be reconfigured into a travelling-wave (ring) cavity configuration. For example, FIG. 8 shows an intracavity optical parametric oscillator quartz enhanced photo-acoustic gas sensor in which an optical cavity for a resonant pump wave and an optical cavity for a resonant down-converted wave both have a travelling-wave (ring) cavity configuration. The ring cavity for the resonant pump wave is defined by four mirrors, M1, M2, M3 and M4. The ring cavity for the resonant down-converted wave is defined by four mirrors, BS1, BS2, M5 and M6. The system shown in FIG. 8 has many optional refinements. For example, fine frequency control can be achieved by utilizing a frequency-selective element such as an etalon in the ring cavity for the resonant pump wave. For the best performance, the travelling optical wave within the ring cavity for the resonant pump wave should propagate in only one direction. A generic uni-directional device is shown in FIG. 8. The uni-directional device may include at least one of a Faraday-isolator type device, an acousto-optic deflector or even a coupled Fox-Li cavity. The wavelength tuning of the system of FIG. 8 may be more controllable than the wavelength tuning of the system of FIG. 4, both in terms of locating the central operating wavelength (tuning into a particular absorption) and for modulation of that frequency (to modulate the absorption in the target molecule and hence generate the acoustic wave). Similarly, FIG. 9 shows an extra cavity, singly resonant optical parametric oscillator quartz enhanced photo-acoustic gas sensor in which an optical cavity for a resonant down-converted wave has a travelling-wave (ring) cavity configuration. FIG. 10 shows an extra cavity, singly resonant optical parametric oscillator quartz enhanced photo-acoustic gas sensor in which an optical enhancement cavity for a pump wave and an optical cavity for a resonant down-converted wave both have a travelling-wave (ring) cavity configuration. As with the systems of FIGS. 4, 6, and 7, the optional optical reference cell shown in FIG. 4 could be used with any of the systems of FIGS. 8, 9 and 10.

The present invention provides a highly compact and ultra-high sensitivity ethane detector with excellent molecular specificity based upon a unique marriage of laser absorption spectroscopy and nonlinear optical mid-infrared light generation technologies. Specifically, a photo-acoustic spectrophone, such as a quartz tuning fork, immersed within the very high optical field in the cavity of a singly-resonant optical parametric oscillator, for example an intracavity OPO. Quartz-enhanced photo-acoustic spectroscopy detection technology has a proven track record in very low noise, high sensitivity measurements in exceptionally compact and cost effective geometries. By placing such a cell within the cavity of an idler-resonant intracavity optical parametric oscillator, many watts of continuous-wave or pulsed, broadly tunable and narrow linewidth optical field is available for acoustic excitation for very low primary pump power requirements. This combination, along with the exceptional signal enhancement which the quartz tuning fork confers, holds the potential for a two orders of magnitude sensitivity improvement over the current state of the art to sub-ppt detectability in a technology which is inherently robust and compact; ideal for in-field deployment.

A skilled person will appreciate that variations of the disclosed arrangements are possible without departing from the scope of the invention. For example, whilst the modulator of FIG. 4 is in the pump section of the cavity, it could alternatively be positioned in the down converted wave cavity. Also, a standard photo acoustic cell which uses a resonant tube and microphone (as opposed to a quartz-enhanced photo acoustic cell) could be used in the context of the device described herein. Accordingly the above description of the specific embodiment is made by way of example only and not for the purposes of limitation. It will be clear to the skilled person that minor modifications may be made without significant changes to the operation described.

The invention claimed is:

1. A sensor comprising:
    an optical parametric oscillator (OPO) having a down converted wave cavity and a non-linear material provided in the down converted wave cavity, the non-linear material being adapted to convert, via a parametric process pump light into down converted light of two different wavelengths, the first wavelength being longer than the second wavelength, wherein the down converted wave cavity is arranged to resonate only one of the first or second wavelengths;
    means for modulating light in the down converted wave cavity to induce an acoustic or pressure wave caused by absorption of a resonant one of the first and second wavelengths; and
    means, located in the downconverted wave cavity of the OPO, for detecting the acoustic or pressure wave.

2. A sensor as claimed in claim 1, wherein the optical parametric oscillator has a pump cavity arranged to resonate the pump light, wherein the pump cavity and the down converted wave cavity partially overlap.

3. A sensor as claimed in claim 2, wherein the non-linear material of the optical parametric oscillator is provided in both the pump wave cavity and the down converted wave cavity.

4. A sensor as claimed in claim 2, wherein the means for modulating light are provided in the pump cavity or the down converted wave cavity.

5. A sensor as claimed in claim 2, wherein means for modulating light comprise an etalon in the pump cavity or the down converted wave cavity.

6. A sensor as claimed in claim 2, wherein means for modulating light comprise a diffraction grating in the pump cavity or the down converted wave cavity.

7. A sensor as claimed in claim 2, wherein the means for modulating light are operable to vary the pump cavity length and/or the down converted wave cavity length.

8. A sensor as claimed in claim 7, wherein the means for modulating light are operable to vary the position of at least one mirror.

9. A sensor as claimed in claim 2, wherein the pump cavity has a standing-wave cavity configuration or a linear cavity configuration.

10. A sensor as claimed in claim 2, wherein the pump cavity has a travelling-wave cavity configuration or a ring cavity configuration.

11. A sensor as claimed in claim 1, wherein the means for detecting the acoustic or pressure wave comprises a photo-acoustic cell that comprises a microphone for detecting the acoustic or pressure wave.

12. A sensor as claimed in claim 11, wherein the microphone comprises a tuning fork.

13. A sensor as claimed in claim 12, wherein the tuning fork comprises a quartz tuning fork.

14. A sensor as claimed in claim 11, wherein the means for modulating light are operable to modulate a resonant light in the down converted wave cavity at a frequency tuned to a resonant frequency of the photo-acoustic cell.

15. A sensor as claimed in claim 11, wherein the photo-acoustic cell comprises a chamber, and wherein the acoustic or pressure wave is induced in a fluid or a gas contained in the chamber as a result of absorption of the resonant one of the first and second wavelengths by the fluid or the gas in the chamber and the microphone is arranged to detect the acoustic or pressure wave induced in the fluid or the gas contained in the chamber.

16. A sensor as claimed in claim 11, wherein the photo-acoustic cell comprises an acoustic resonator for enhancing the acoustic or pressure wave to form an enhanced acoustic or pressure wave, and wherein the microphone is configured to detect the enhanced acoustic or pressure wave.

17. A sensor as claimed in claim 16, wherein the acoustic resonator comprises a micro-resonator tube having an opening located adjacent the microphone.

18. A sensor as claimed in claim 16, wherein the acoustic resonator comprises two micro-resonator tubes, one micro-resonator tube located either side of the microphone with an opening of each micro-resonator tube adjacent the microphone.

19. A sensor as claimed in claim 1, wherein the means for modulating light are operable to modulate the primary pump power source.

20. A sensor as claimed in claim 1, wherein a first, longer wavelength is resonant in the down converted wave cavity.

21. A sensor as claimed in claim 1, wherein a wavelength of the resonant light is selected to match an absorption characteristic of a fluid of interest.

22. A sensor as claimed in claim 1, wherein a wavelength of the resonant light is selected to match an absorption characteristic of a particulate suspended in a fluid.

23. A sensor as claimed in claim 1, wherein the resonant wavelength is between 3.2 µm and 3.4 µm.

24. A sensor as claimed in claim 1 comprising an amplifier for enhancing the acoustic or pressure wave.

25. A sensor as claimed in claim 1 comprising a photo-detector to monitor a strength of the circulating down converted optical field.

26. A sensor as claimed in claim 1 comprising a reference cell containing reference fluid.

27. A sensor as claimed in claim 26 configured to use the reference cell to ensure the optical parametric oscillator is tuned to a predetermined wavelength.

28. A sensor as claimed in claim 1, wherein the optical parametric oscillator is operated in a continuous wave (CW) mode.

29. A sensor as claimed in claim 1, wherein the optical parametric oscillator is operated in a pulsed mode.

30. A sensor as claimed in claim 1, wherein the optical parametric oscillator is doubly or multiply resonant.

31. A sensor as claimed in claim 1, wherein the down converted wave cavity has a standing-wave cavity configuration or a linear cavity configuration.

32. A sensor as claimed in claim 1, wherein the down converted wave cavity has a travelling-wave cavity configuration or a ring cavity configuration.

33. A sensor as claimed in claim 1, wherein the means for modulating light are operable to modulate the primary pump power source, thereby to modulate an amplitude or frequency of the pump light.

* * * * *